(12) United States Patent  (10) Patent No.: US 7,979,451 B2
Sheehan  (45) Date of Patent: Jul. 12, 2011

(54) DATA MANIPULATION COMMAND METHOD AND SYSTEM

(75) Inventor: Alexander Brantley Sheehan, Atlanta, GA (US)

(73) Assignee: International Business Machines Corporation, Armonk, NY (US)

(*) Notice: Subject to any disclaimer, the term of this patent is extended or adjusted under 35 U.S.C. 154(b) by 613 days.

(21) Appl. No.: 12/051,518

(22) Filed: Mar. 19, 2008

(65) Prior Publication Data

US 2009/0241125 A1  Sep. 24, 2009

(51) Int. Cl.
*G06F 17/30* (2006.01)
(52) U.S. Cl. .......................... 707/756; 707/791; 707/955
(58) Field of Classification Search .................. 707/756, 707/791, 955
See application file for complete search history.

(56) References Cited

U.S. PATENT DOCUMENTS

| | | | | |
|---|---|---|---|---|
| 5,073,963 | A * | 12/1991 | Sammons et al. | 382/128 |
| 6,418,448 | B1 * | 7/2002 | Sarkar | 707/707 |
| 6,436,442 | B1 * | 8/2002 | Woo et al. | 424/488 |
| 6,507,898 | B1 * | 1/2003 | Gibson et al. | 711/168 |
| 6,674,536 | B2 * | 1/2004 | Long et al. | 358/1.15 |
| 6,707,463 | B1 * | 3/2004 | Gibson et al. | 345/619 |
| 2003/0109940 | A1 * | 6/2003 | Guntzer et al. | 700/52 |
| 2005/0026131 | A1 * | 2/2005 | Elzinga et al. | 434/365 |
| 2005/0044145 | A1 * | 2/2005 | Quinn et al. | 709/205 |
| 2009/0033656 | A1 * | 2/2009 | Larkins et al. | 345/419 |
| 2009/0198780 | A1 * | 8/2009 | Koch | 709/206 |
| 2010/0005025 | A1 * | 1/2010 | Kumar et al. | 705/40 |

OTHER PUBLICATIONS

Chris Fehily, "SQL: Visual QuickStart Guide," Peachpit Press, 2002.*
Chris Fehily, SQL: Visual QuickStart Guide, Peachpit Press, 2002.*

* cited by examiner

*Primary Examiner* — John R. Cottingham
*Assistant Examiner* — Alexandria Y Bromell
(74) *Attorney, Agent, or Firm* — Schmeiser, Olsen & Watts; John R. Pivnichny (57) ABSTRACT

A data manipulation method and system. The method includes receiving and storing by a computing system, configuration data and a first list comprising first group of data objects. The computing system generates a second list associated with the first list. The second list comprises a second group of data objects associated with the first group of data objects. The computing system compares the first group to the second group to determine if any attribute values associated with the first group are equal to any associated attribute values associated with the second group. The computing system generates a third list based on the comparing and the configuration data. The third list comprises a third group of data objects associated with the first group and of data objects. The computing system stores the third list.

22 Claims, 6 Drawing Sheets

DATA MANIPULATION COMMAND METHOD AND SYSTEM

FIELD OF THE INVENTION

The present invention relates to a method and associated system for generating data manipulation commands.

BACKGROUND OF THE INVENTION

Modifying data in systems typically comprises an inefficient process with little flexibility. Accordingly, there exists a need in the art to overcome at least some of the deficiencies and limitations described herein above.

SUMMARY OF THE INVENTION

The present invention provides a method comprising:
receiving, by a computing system, configuration data, wherein said computing system comprises a memory system, wherein said memory system comprises a first list comprising first group of data objects, and wherein each data object of said first group of data objects comprises attributes;
storing said configuration data in said memory system;
generating, by said computing system in response to a command from a user, a second list associated with said first list, wherein said second list comprises a second group of data objects associated with said first group of data objects, and wherein each data object of said second group of data objects comprises attributes;
comparing, by said computing system, each said data object of said first group of data objects to an associated data object of said second group of data objects to determine if any attribute values associated with said attributes comprised by said first group of data objects are equal to any associated attribute values associated with said attributes comprised by said second group of data objects;
retrieving, by said computing system from said memory system said configuration data;
generating, by said computing system based on said comparing and said configuration data, a third list, wherein said third list comprises a third group of data objects associated with said first group of data objects and said second group of data objects; and
storing by said computing system in said memory system, said third list.

The present invention provides a computing system comprising a processor coupled to a computer-readable memory unit, said memory unit comprising instructions that when executed by the processor implements a data manipulation method, said method comprising:
receiving, by said computing system, configuration data, wherein said memory unit comprises a first list comprising first group of data objects, and wherein each data object of said first group of data objects comprises attributes;
storing said configuration data in said memory system;
generating, by said computing system in response to a command from a user, a second list associated with said first list, wherein said second list comprises a second group of data objects associated with said first group of data objects, and wherein each data object of said second group of data objects comprises attributes;
comparing, by said computing system, each said data object of said first group of data objects to an associated data object of said second group of data objects to determine if any attribute values associated with said attributes comprised by said first group of data objects are equal to any associated attribute values associated with said attributes comprised by said second group of data objects;
retrieving, by said computing system from said memory system said configuration data;
generating, by said computing system based on said comparing and said configuration data, a third list, wherein said third list comprises a third group of data objects associated with said first group of data objects and said second group of data objects; and
storing by said computing system in said memory system, said third list.

The present invention advantageously provides a simple method and associated system capable of modifying in systems.

BRIEF DESCRIPTION OF THE DRAWINGS

FIG. 2 which includes FIGS. 2A and 2B illustrates a flowchart describing an algorithm used by the system of FIG. 1 for generating multiple data manipulation operations, in accordance with embodiments of the present invention.

FIG. 3 which includes FIGS. 3A and 3B illustrates a component diagram describing a usage process for implementing the algorithm of FIG. 2 for generating and processing multiple data manipulation operations, in accordance with embodiments of the present invention.

DETAILED DESCRIPTION OF THE INVENTION

Figure 1:
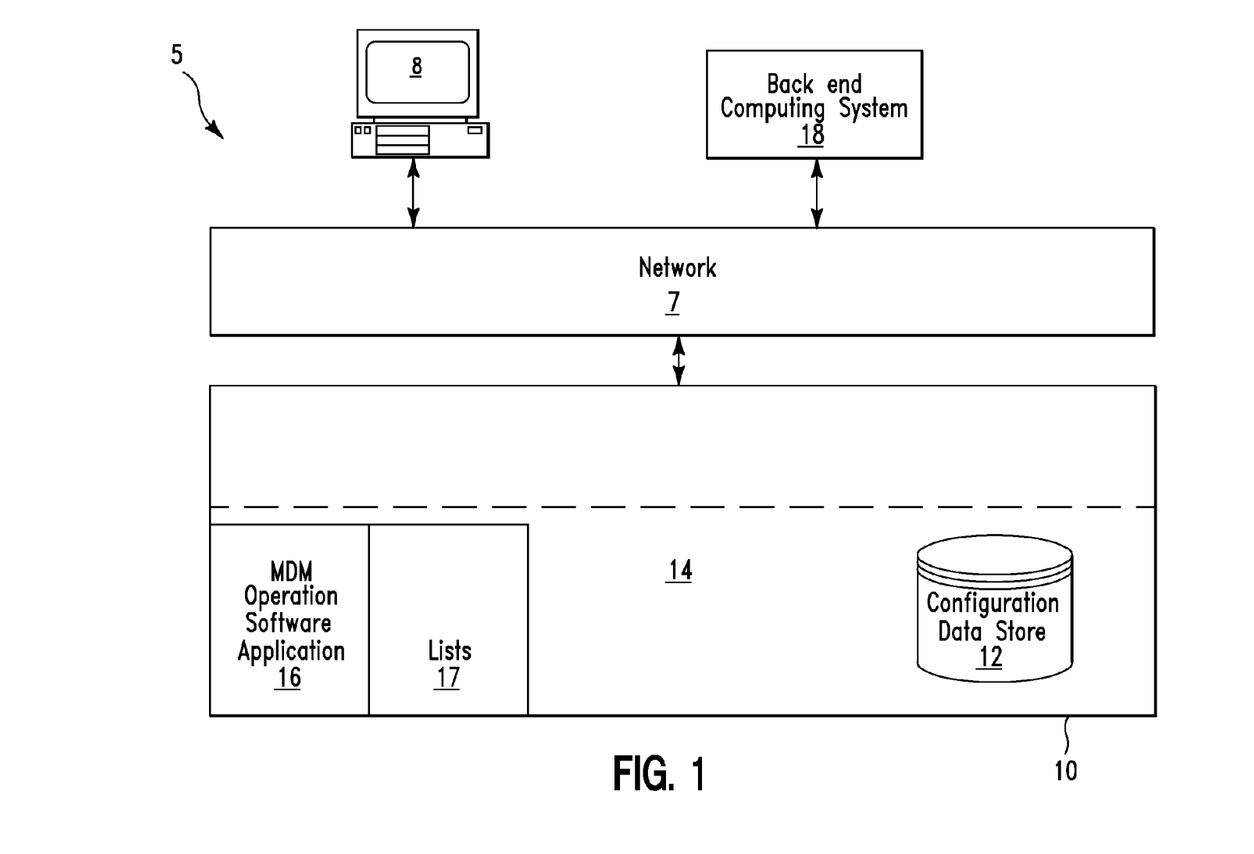
FIG. 1 illustrates a system 5 for generating multiple data manipulation operations, in accordance with embodiments of the present invention.

FIG. 1 illustrates a system 5 for generating multiple data manipulation operations, in accordance with embodiments of the present invention. System 5 of FIG. 1 comprises a computing apparatus 8 and a back end computing system 18 connected to a front end computing system 10 through a network 7. Network 7 may comprise any type of network including, inter alia, a local area network, (LAN), a wide area network (WAN), the Internet, etc. Back end computing system 18 may comprise any type of computing system(s) including, inter alia, a personal computer (PC), a server computer, a database computer, etc. Front end computing system 10 may comprise any type of computing system(s) including, inter alia, a personal computer (PC), a server computer, a database computer, etc. Front end computing system 10 is used to retrieve an original list of data items, make changes which result in a new list of data items, and generate a multiple data manipulation list that is subsequently sent to back end computing system 18 for processing. Front end computing system 10 comprises a memory system 14 (e.g., an application server). Memory system 14 may comprise a single memory system (e.g., a single application server). Alternatively, memory system 14 may comprise a plurality of memory systems (e.g., multiple application servers). Memory system 14 comprises a multiple data manipulation operation software application 16, lists 17 (e.g., a multiple data manipulation list as described with reference to FIGS. 2 and 3, infra), and a configuration data store 12. Configuration data store 12 comprises configuration data used for generating a multiple data manipulation list. Computing apparatus 8 may comprise, inter alia, a personal computer, a laptop computer, a computer terminal, etc. Computing apparatus 8 may comprise a single computing apparatus or a plurality of computing apparatuses. Computing apparatus 8 is used by users (e.g., user 8*a* in FIG. 3 as described, infra) for generating and updating lists 17.

Multiple data manipulation operation software application 16 is used to generate a multiple data manipulation operation list. The following process steps illustrate a multiple data manipulation operation generation process performed by front end computing system 10:

1. Front end computing system 10 receives a first list comprising a first group of data objects. Each data object of the first group of data objects includes attributes. Each attribute includes an attribute value. For example an attribute (e.g., name) may comprise a value of C.
2. The first list is stored with lists 17 in memory system 14.
3. Front end computing system 10 receives configuration data.
4. The configuration data is stored in memory system 14.
5. Front end computing system 10 generates (i.e., in response to a command from a user via computing apparatus 8) a second list associated with the first list. The second list comprises a second group of data objects associated with the first group of data objects. Each data object of the second group of data objects includes attributes (i.e., same attributes as the attributes each data object of the first group of data objects). Each attribute for the second group of data objects includes an attribute value. The attribute values for the attributes associated with the second group of data objects may comprise different attributes values from the attribute values for the attributes associated with the first group of data objects. For example, an attribute (e.g., name) associated with the first group of data objects may comprise a value of C and an attribute (e.g., name) associated with the second group of data objects may comprise a value of D.
6. Front end computing system 10 compares each data object of the first group of data objects to an associated data object of the second group of data objects to determine if any attribute values associated with the attributes comprised by the first group of data objects are the same or different from any associated attribute values associated with the attributes comprised by the second group of data objects.
7. Front end computing system 10 retrieves the configuration data from configuration data store 12.
8. Front end computing system 10 generates (i.e., based on the comparing from step 6 and the configuration data) a multiple data manipulation operation list. The multiple data manipulation operation list includes a third group of data objects associated with the first group of data objects and the second group of data objects.
9. Front end computing system 10 stores the multiple data manipulation operation list.
10. Front end computing system 10 transmits the multiple data manipulation operation list to back end computing system 18 for processing (i.e., for modifying data). Back-end computing system 18 accepts the multiple data manipulation operation list for processing in order to determine data manipulation operations to be performed against the data in a data store.

Figures 2, 2B:
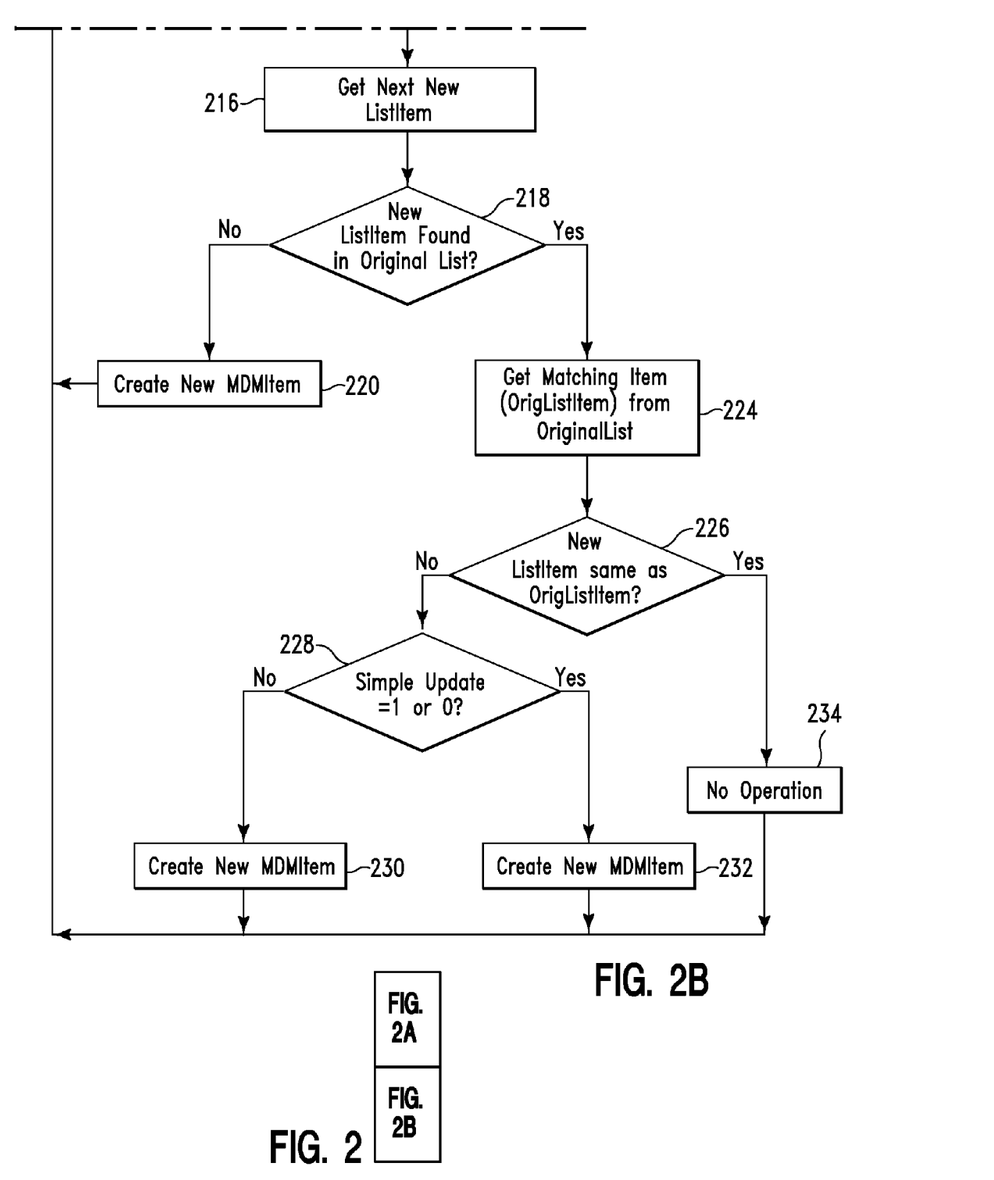
Figure 2A:
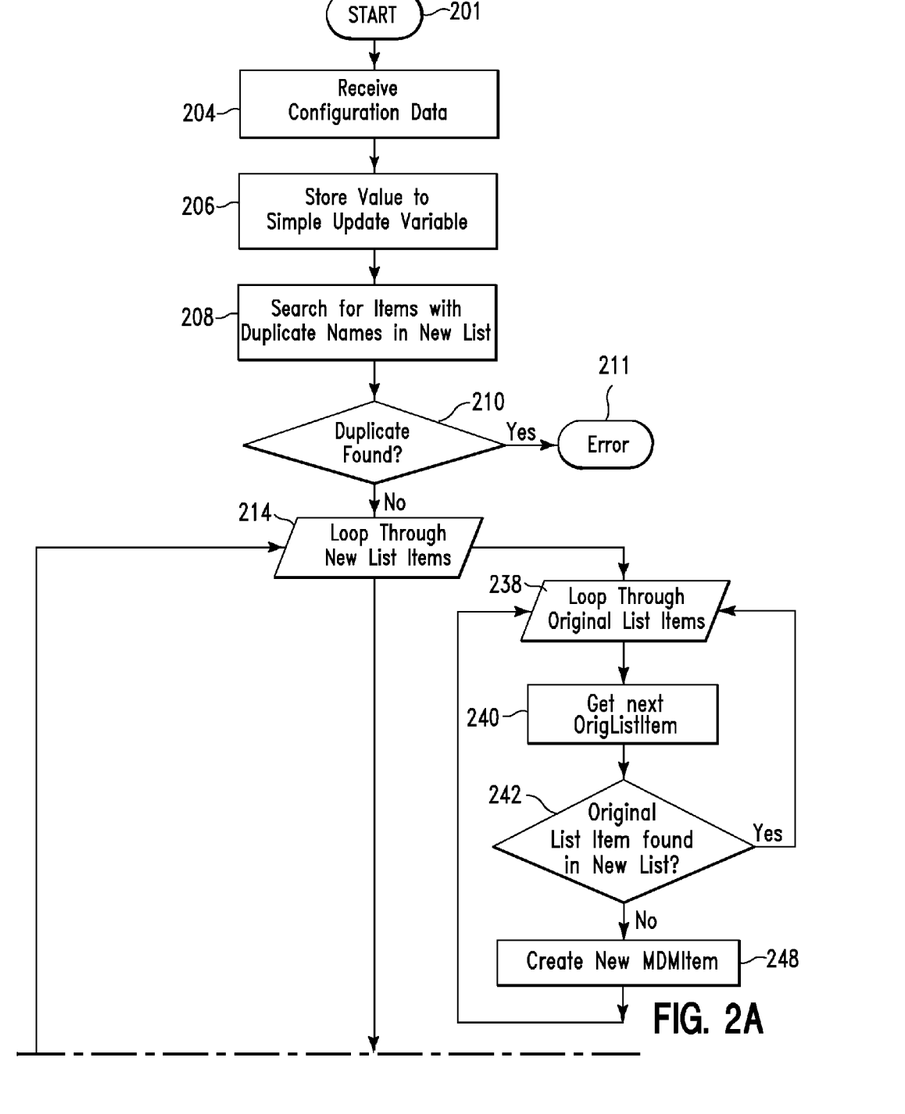

FIG. 2 which includes FIGS. 2A and 2B illustrates a flowchart describing an algorithm used by system 5 of FIG. 1 for generating multiple data manipulation operations, in accordance with embodiments of the present invention. In step 201, the process is initiated. In step 204, a front end computing system (e.g., front end computing system 10 of FIG. 1) receives and stores configuration data. The configuration data may comprise a SimpleUpdate configuration setting value. In step 206, the SimpleUpdate configuration setting value is stored in a SimpleUpdate variable. In step 208, an original (i.e., first initial list) of data objects (i.e., items) is compared to a new (i.e., modified) list of items (i.e., modified by a user) to determine if any identifying attributes are equal. In step 210, it is determined if there are two items (i.e., from the original list and the new list) with identifying attributes that are equal (i.e., a duplicate found). If in step 210, it is determined that there are two items (i.e., from the original list and the new list) whose identifying attributes are equal then in step 211, an error message is generated and processing is terminated. The error message may be transmitted back to the user. If in step 210, it is determined if there are not two items (i.e., from the original list and the new list) whose identifying attributes are equal then in step 214, (i.e. starting at the first data object in the new list) continue to iterate through items in the new list until the end of the list is reached (i.e., loop through the items in the new list until there are no more items) and step 214 is executed (i.e., as described, infra). In step 216, a next item in the new list is retrieved and all the data (attribute) values of the next item are stored in a new list item variable. In step 218, it is determined if the identifying attribute (i.e., a name) of the new list item (data object) is found in the original list of items (data objects).

If in step 218, it is determined that the identifying attribute (i.e., a name) of the new list item (data object) is not found in the original list of items (data objects) then in step 220, (i.e., since the identifying attribute of this new list item data object was not found in the original list of data objects) an multiple data manipulation (MDM) data object (i.e., mdmItem) will be created, whose data (attribute) values will inform the process MDM object list to ADD this data item to a data store (i.e., in back end computing system 18) and step 214 is repeated. This mdmItem object will be populated as follows:

1. An identifying attribute (e.g., attrName) will be assigned the value of a name attribute from this NewListItem object.
2. An existingItem attribute will be assigned a null value.
3. A newItem attribute will be assigned all of the data values of this NewListItem object.

If in step 218, it is determined that the identifying attribute (i.e., a name) of the new list item (data object) is found in the original list of items (data objects) then in step 224, an UPDATE operation will be performed. Since the identifying attribute of this NewListItem data object was found in the original list of data objects step 224 will find the matching item in the original list and populate the origListItem object with its data values. In step 226, it is determined if data values in the origListItem object are equal to data values in the NewListItem object. If in step 226, it is determined that the data values are the same then in step 234, no operation is performed and step 214 is repeated. If in step 226, it is determined that the data values are different, then in step 228, it is determined if a SimpleUpdate variable value is 1/true/yes or 0/false/no. If in step 228, it is determined that the SimpleUpdate variable value is 0/false/no then in step 230 a new mdmItem object is generated and populated as follows:

1. An attrName will be assigned the value of the name attribute in this NewListItem.
2. The existing item attribute will be populated with all the data values from the original list item object.
3. The new item attribute will be with all the data values from this NewListItem.

If in step 228, it is determined that the SimpleUpdate variable value is 1/true/yes then in step 232, a new mdmItem object is generated and populated it as follows:

1. An attrName will be assigned the value of the name attribute in this NewListItem.

2. The existing item attribute will be created with only the attributes that had been changed by the user. For example, it the item originally had three attributes, but the user only changed the value attribute, then this newItem attribute will only consist of the value attribute.

In step 238, (i.e., after the new list items have been processed for ADD and UPDATE operations), the original list is iterated to create a list of DELETE operations. The front end computing system loops through the items in the original list until there are no more items. The mdmItems created during the processing of this loop correspond to items in the original list that are not found in the new list. In step 238, (i.e., after the logic has iterated through all the original list items), DELETE operations are identified and corresponding items are added to the MDM list). In step 240, a next item in the original list is retrieved and all the data values of the next item are stored in an OriginalListItem variable. In step 242, it is determined if an identifying attribute of an originalListItem data object (e.g. a name attribute value) is found in the new list. If in step 242, it is determined that an identifying attribute of an originalListItem data object (e.g. a name attribute value) is found in the new list then step 238 is repeated. If in step 242, it is determined that an identifying attribute of an originalListItem data object (e.g. a name attribute value) is not found in the new list then in step 248, an MDM data object (i.e., the mdmitem) is generated. The MDM data object comprises data values will tell the Process MDM Object List to DELETE this data item from a data store. The mdmItem object will be populated as follows:

1. An attrName attribute will be assigned the value of the name attribute from the originalListItem object.
2. An existing item attribute will be assigned all the data values of the originalListItem object.
3. The new item attribute will be assigned a value of null.

Figures 3, 3B:
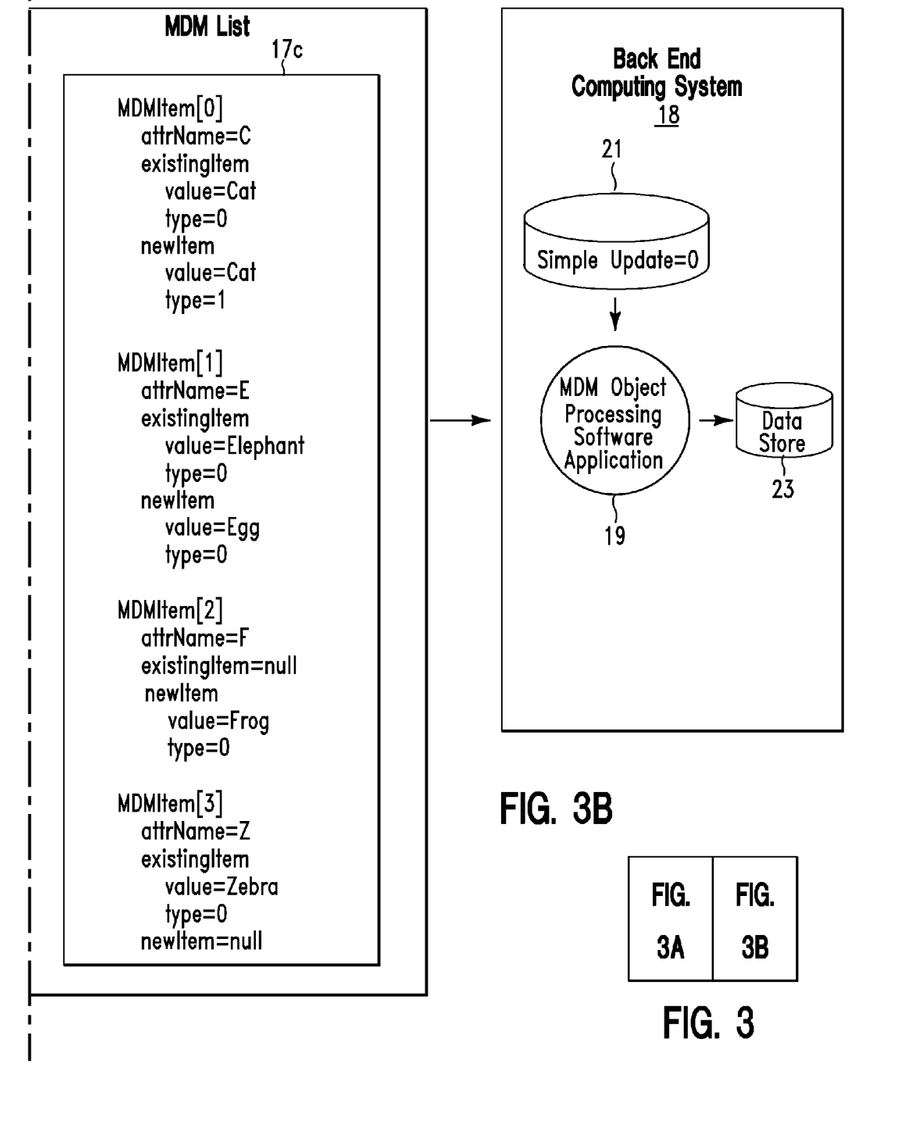
Figure 3A:
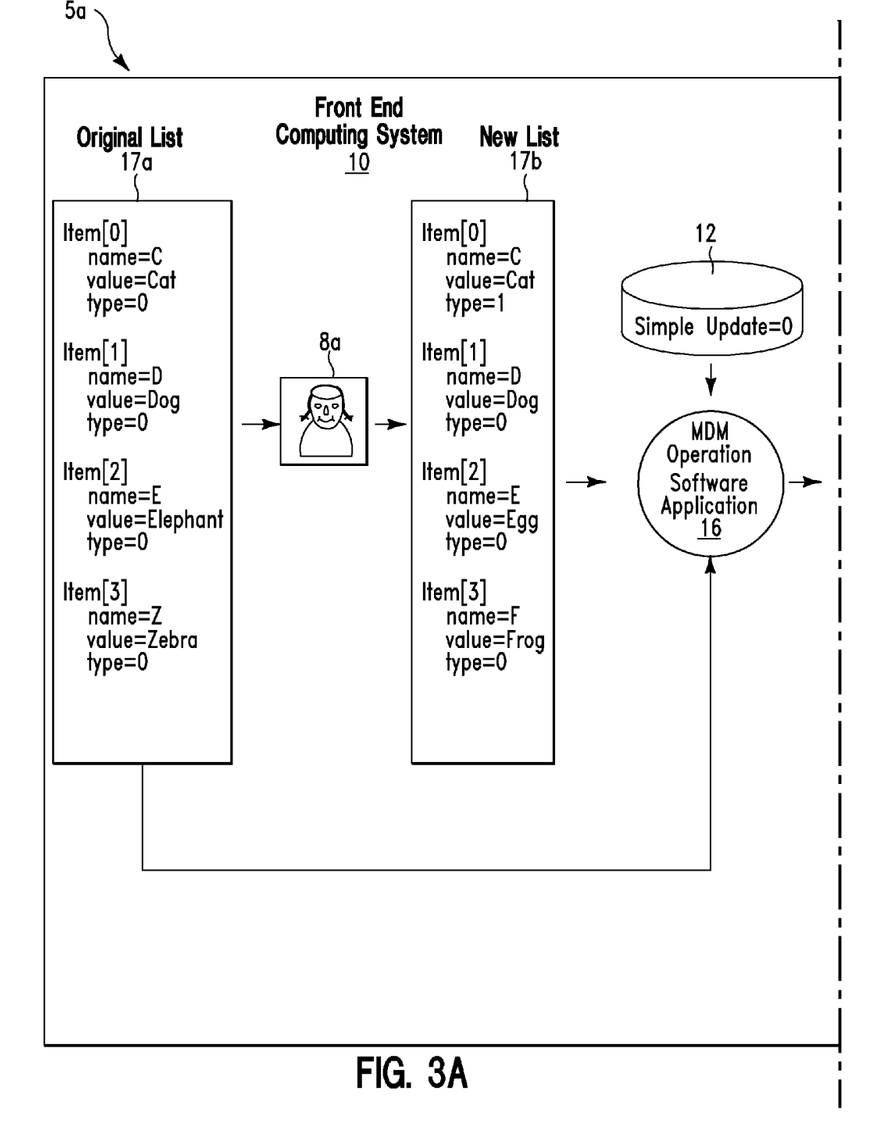

FIG. 3 which includes FIGS. 3A and 3B illustrates a component diagram describing a usage process for implementing the algorithm of FIG. 2 for generating and processing multiple data manipulation operations, in accordance with embodiments of the present invention. The usage process for system 5*a* illustrated in FIG. 3 additionally describes a process for processing multiple data manipulation (MDM) operations. The usage process is implemented by comparing an original list of data objects 17*a* to a new list of data objects 17*b* (i.e., the new list comprises the original list which has been modified by a user on front end system computing system 10) in order to generate an MDM list 17*c*. MDM list 17*c* will dictate a minimal set of data manipulation operations. System 5*a* retrieves all multiple data changes performed by the user on front end system computing system 10 and packages them into a single request (i.e., MDM list 17*c*) which backend computing system 18 may unpack and perform.

The following process steps illustrate a processing flow performed by system 5*a* for generating and processing minimal required multiple data manipulation operations:

1. An original list 17*a* of data objects is retrieved. There are four items on original list 17*a* of data objects. A first item (i.e., data object) on original list 17*a* is Item[0] which has three attributes. Each attribute comprises a name and a value. The name of a first attribute for Item[0] is name. A value of the first attribute for Item[0] is C. An alternative way for expressing this name and value for the first attribute for Item[0] is: name=C. The remaining two attributes of Item[0] are value=Cat and type=0. The remaining three attributes for the original list are as follows: Attributes for Item[1] are: name=D, value=Dog, type=0. Attributes for Item[2] are: name=E, value=Elephant, type=0. Attributes for Item[3] are: name=Z, value=Zebra, type=0.

2. A new list 17*b* of data objects is generated by a user 8*a*. New list 17*b* of data objects results from user 8*a* who starts with original list 17*b* and performs front-end data manipulation operations (e.g., updates to existing data items, deletes original data items, adds new data items, et c). User 8*a* performs these operations in a front-end software application such as, inter alia, a web browser. User 8*a* may remove a data item completely, update a data item by modifying an attribute, add a new data item new list 17*b*, or perform no operation. New list 17*b* comprises four data objects. A first data object, Item[0] comprises three attributes, name=C, value=Cat, type=1. Note that user 8*a* changed the type attribute value from original list 16*a* from 0 to 1. A second data object, Item[1] comprises three attributes, name=D, value=Dog, and type=0. This data object is identical to the data object in original list 17*a* whose identity attribute, name, has the value of D. The attributes of a third data object, Item[2] comprises name=E, value=Egg, and type=0. The value attribute was changed in original list 17*a* from Elephant to Egg. A fourth data object, Item[3] comprises three attributes: name=F, value=Frog, and type=0. There is no data object in original list 17*a* who's identifying attribute and name comprises a value of F. Therefore, this is a new attribute which will ultimately result in an Add operation.

3. Front end system computing system 10 (i.e., MDM operation software application 16) generates (i.e., in response to user 8*a* command) a multiple data manipulation (MDM) list 17*c*. The data objects (i.e., items) on MDM list 17*c* represent the minimal data manipulation operations that have been determined by MDM operation software application 16 based on changes between original list 17*a* and new list 17*b*. MDM operation software application 16 aggregates all data manipulation operations into a single efficient data manipulation request to be performed on backend computing system 18. There are four data objects MDM list 17*c* of data objects. A first MDM item MdmItem[0] comprises attributes: attrName=C, existingItem which is a data object, whose attributes are: value=Cat, and type=0. MdmItem[0]'s third attribute is also a data object: newItem, whose attributes are: value=Cat and type=1. This mdm data item, MdmItem[0] has data in both the existingItem and newItem attributes, which MDM operation software application 16 will interpret as an UPDATE operation. A second mdm item comprises MdmItem[1], whose attributes are as follows: attrName=E, existingItem: value=Elephant, type=0, newItem: type=Egg, type=0. This mdm item additionally comprises data in both the existingItem and newItem attributes, which MDM operation software application 16 will interpret as an UPDATE operation. A third mdm item comprises MdmItem[2], whose attributes are as follows: attrName=F, existingItem=null, newItem: value=Frog, type=0. Since the existingItem is null, MDM operation software application 16 will interpret this as an ADD operation. A fourth mdm item is MdmItem[3], whose attributes are as follows: attrName=Z, existingItem: value=Zebra, type=0, newItem=null. Since the newItem attribute is null, MDM operation software application 16 will interpret this as a DELETE operation.

4. MDM operation software application 16 retrieves configuration data from configuration data store 12 in order to retrieve a SimpleUpdate configuration setting. If SimpleUpdate configuration setting equals zero (or false) then MDM operation software application 16 will populate MDM list 17*c* with a full set of attributes so that the back end computing system 18 comprises enough information to perform a DELETE and an ADD (which requires all the full set of attributes) command. If SimpleUpdate configuration setting equals 1 (or true) then MDM operation software application 16 will only add changes to the attributes of the existingItem attribute object and the newItem attribute object as it builds MDM list 17c.

5. Front end system computing system 10 transmits MDM list 17c to backend computing system 18 for processing.

6. Configuration data store 12a comprises configuration data used by MDM object processing software application 19 in order to retrieve a SimpleUpdate configuration setting. If the SimpleUpdate configuration setting equals zero (or false) then MDM object processing software application 19 will perform a DELETE and then an ADD operation. If the SimpleUpdate configuration setting equals 1 (or true) then MDM object processing software application 19 will perform a single UPDATE operation.

7. MDM object processing software application 19 retrieves MDM list 17c as input and generates data manipulation operations to either ADD, DELETE or MODIFY data in data store 23. Data store 23 comprises the data from which original list 17a was created and which will store the results of the data manipulation operations that are generated by MDM object processing software application 19. In this example, the data record/object whose identifying field has a value of C will have its value field updated with the value of Cat and its type field updated with the value of 1. Similarly, the data record/object in data store 23 whose identifying field has a value of E will be updated with a value of Egg and its type field updated with a value of 0. Note that all of the attributes are included in MDM items. This allows the flexibility of performing a single UPDATE operation or slightly modifying the MDM object processing software application 19 in order to perform a DELETE command followed by an ADD command to accomplish the same goal of updating the data object with the changes. MDM object processing software application 19 will add a record/object to data store 23 whose identifying field has a value of F, whose value field has a value of Frog, and whose type field has a value of 0. MDM object processing software application 19 will delete the record/object from data store 23 whose identifying field has a value of Z.

Figure 4:
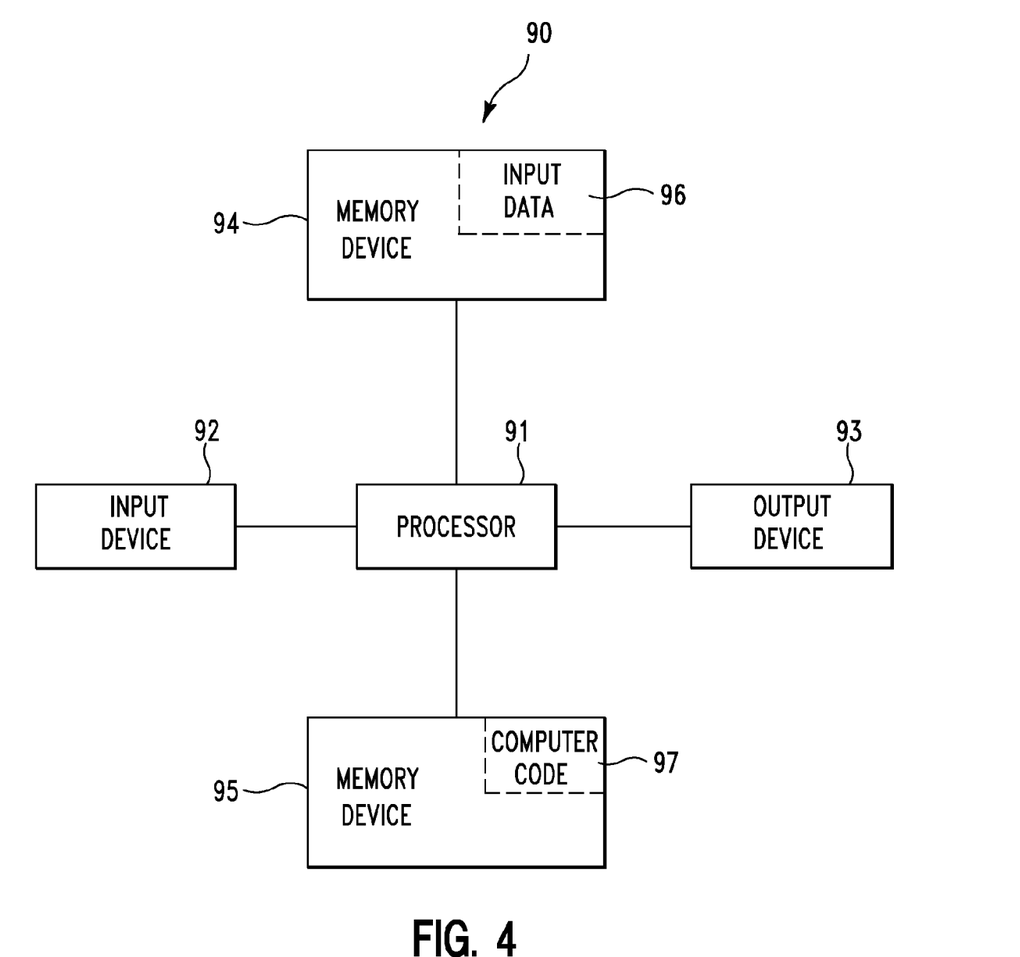
FIG. 4 illustrates a computer apparatus used for generating and processing multiple data manipulation operations, in accordance with embodiments of the present invention.

FIG. 4 illustrates a computer apparatus 90 (e.g., front end computing system 10 of FIG. 1) used for generating and processing multiple data manipulation operations, in accordance with embodiments of the present invention. The computer system 90 comprises a processor 91, an input device 92 coupled to the processor 91, an output device 93 coupled to the processor 91, and memory devices 94 and 95 each coupled to the processor 91. The input device 92 may be, inter alia, a keyboard, a software application, a mouse, etc. The output device 93 may be, inter alia, a printer, a plotter, a computer screen, a magnetic tape, a removable hard disk, a floppy disk, a software application, etc. The memory devices 94 and 95 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 95 includes a computer code 97. The computer code 97 includes algorithms (e.g., the algorithm of FIG. 2) for generating and processing multiple data manipulation operations. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices not shown in FIG. 4) may comprise the algorithm of FIG. 2 and may be used as a computer usable medium (or a computer readable medium or a program storage device) having a computer readable program code embodied therein and/or having other data stored therein, wherein the computer readable program code comprises the computer code 97. Generally, a computer program product (or, alternatively, an article of manufacture) of the computer system 90 may comprise said computer usable medium (or said program storage device).

Still yet, any of the components of the present invention could be created, integrated, hosted, maintained, deployed, managed, serviced, etc. by a service provider who offers to generate and process multiple data manipulation operations. Thus the present invention discloses a process for deploying, creating, integrating, hosting, maintaining, and/or integrating computing infrastructure, comprising integrating computer-readable code into the computer system 90, wherein the code in combination with the computer system 90 is capable of performing a method for generating and processing multiple data manipulation operations. In another embodiment, the invention provides a business method that performs the process steps of the invention on a subscription, advertising, and/or fee basis. That is, a service provider, such as a Solution Integrator, could offer to generate and process multiple data manipulation operations. In this case, the service provider can create, maintain, support, etc. a computer infrastructure that performs the process steps of the invention for one or more customers. In return, the service provider can receive payment from the customer(s) under a subscription and/or fee agreement and/or the service provider can receive payment from the sale of advertising content to one or more third parties.

While FIG. 4 shows the computer system 90 as a particular configuration of hardware and software, any configuration of hardware and software, as would be known to a person of ordinary skill in the art, may be utilized for the purposes stated supra in conjunction with the particular computer system 90 of FIG. 4. For example, the memory devices 94 and 95 may be portions of a single memory device rather than separate memory devices.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A method comprising:
  receiving, by a computing system, configuration data, wherein said computing system comprises a memory system, wherein said memory system comprises a first list comprising first group of data objects, and wherein each data object of said first group of data objects comprises attributes including a name attribute, a value attribute, and a type attribute and wherein each attribute of said attributes comprised by said first group of data objects;
  storing said configuration data in said memory system;
  generating, by said computing system in response to a command from a user, a second list associated with said first list, wherein said second list comprises a second group of data objects associated with said first group of data objects, and wherein each data object of said second group of data objects comprises attributes including a name attribute, a value attribute, and a type attribute, and wherein each attribute of said attributes comprised by said second group of data objects;

comparing, by said computing system, each said data object of said first group of data objects to an associated data object of said second group of data objects to determine if any attribute values associated with said attributes comprised by said first group of data objects are equal to any associated attribute values associated with said attributes comprised by said second group of data objects;

retrieving, by said computing system from said memory system said configuration data;

generating, by said computing system based on said comparing and said configuration data, a third list, wherein said third list comprises a third group of data objects associated with said first group of data objects and said second group of data objects, wherein each data object of said third group of data objects comprises attributes including an attribute name, an existing item value, an existing item type, a new item value, and a new item type;

storing by said computing system in said memory system, said third list generating, by said computing system, data manipulation operations associated with manipulating data;

executing, by said computing system, said data manipulation operations with respect to said third group of data objects of said third list; and modifying, by said computing system based on said executing said data manipulation operations, associated data in a data store.

2. The method of claim 1, wherein said comparing determines that at least two attribute values comprised by a first data object of said first group of data objects are equal to at least two attribute values comprised by a second data object of said second group of data objects, and wherein said method further comprises:

generating, by said computing system, an error message; and transmitting, by said computing system to a user, said error message.

3. The method of claim 1, further comprising:

transmitting by said computing system to a back end computing system, said third list.

4. The method of claim 1, wherein said comparing determines that a first attribute value for a first attribute comprised by a first data object of said first group of data objects differs from a second attribute value for a second attribute comprised by a second data object of said second group of data objects, and wherein said method further comprises:

generating, by said computing system, a data manipulation replace command for replacing said first attribute value with said second attribute value; and storing, by said computing system, said data manipulation replace command on said third list.

5. The method of claim 1, wherein said comparing determines that there is no attribute value for a first attribute comprised by a first data object of said first group of data objects and there is a second attribute value for a second attribute comprised by a second data object of said second group of data objects, and wherein said method further comprises:

generating, by said computing system, a data manipulation add command for adding said second attribute value to said first attribute; and storing, by said computing system, said data manipulation add command on said third list.

6. The method of claim 1, wherein said comparing determines that there is a first attribute value for a first attribute comprised by a first data object of said first group of data objects and there is no attribute value for a second attribute comprised by a second data object of said second group of data objects, and wherein said method further comprises:

generating, by said computing system, a data manipulation delete command for deleting said first attribute value; and storing, by said computing system, said data manipulation delete command on said third list.

7. The method of claim 1, wherein said configuration data indicates that said third group of data objects comprise only data objects that comprise changes between said first group of data objects and said second group of data objects.

8. The method of claim 1, wherein said configuration data indicates that said third group of data objects comprise first data objects that comprise changes between said first group of data objects and said second group of data objects and second data objects that do not comprise changes between said first group of data objects and said second group of data objects.

9. The method of claim 1, wherein said comparing is performed as a sequential process comprising multiple iterations.

10. The method of claim 1, wherein said configuration data comprises a configuration setting value for defining said third list, and wherein said configuration setting value is saved as a variable.

11. A process for supporting computer infrastructure, said process comprising providing at least one support service for at least one of creating, integrating, hosting, maintaining, and deploying computer-readable code in said computing system, wherein the code in combination with said computing system is capable of performing the method of claim 1.

12. A computer program product, comprising a computer storage medium comprising a computer readable program code embodied therein, said computer readable program code configured to perform the method of claim 1 upon being executed by a processor of said computing system.

13. A computing system comprising a processor coupled to a computer-readable memory unit, said memory unit comprising instructions that when executed by the processor implements a data manipulation method, said method comprising:

receiving, by said computing system, configuration data, wherein said memory unit comprises a first list comprising first group of data objects, and wherein each data object of said first group of data objects comprises attributes including a name attribute, a value attribute, and a type attribute, and wherein each attribute of said attributes comprised by said first group of data objects;

storing said configuration data in said memory system;

generating, by said computing system in response to a command from a user, a second list associated with said first list, wherein said second list comprises a second group of data objects associated with said first group of data objects, and wherein each data object of said second group of data objects comprises attributes including a name attribute, a value attribute, and a type attribute and wherein each attribute of said attributes comprised by said second group of data objects;

comparing, by said computing system, each said data object of said first group of data objects to an associated data object of said second group of data objects to determine if any attribute values associated with said attributes comprised by said first group of data objects are equal to any associated attribute values associated with said attributes comprised by said second group of data objects;

retrieving, by said computing system from said memory system said configuration data;

generating, by said computing system based on said comparing and said configuration data, a third list, wherein said third list comprises a third group of data objects associated with said first group of data objects and said second group of data objects, wherein each data object of said third group of data objects comprises attributes including an attribute name, an existing item value, an existing item type, a new item value, and a new item type;

storing by said computing system in said memory system, said third list generating, by said computing system, data manipulation operations associated with manipulating data;

executing, by said computing system, said data manipulation operations with respect to said third group of data objects of said third list; and modifying, by said computing system based on said executing said data manipulation operations, associated data in a data store.

14. The computing system of claim 13, wherein said comparing determines that at least two attribute values comprised by a first data object of said first group of data objects are equal to at least two attribute values comprised by a second data object of said second group of data objects, and wherein said method further comprises:

generating, by said computing system, an error message; and transmitting, by said computing system to a user, said error message.

15. The computing system of claim 13, wherein said method further comprises:

transmitting by said computing system to a back end computing system, said third list.

16. The computing system of claim 13, wherein said comparing determines that a first attribute value for a first attribute comprised by a first data object of said first group of data objects differs from a second attribute value for a second attribute comprised by a second data object of said second group of data objects, and wherein said method further comprises:

generating, by said computing system, a data manipulation replace command for replacing said first attribute value with said second attribute value; and storing, by said computing system, said data manipulation replace command on said third list.

17. The computing system of claim 13, wherein said comparing determines that there is no attribute value for a first attribute comprised by a first data object of said first group of data objects and there is a second attribute value for a second attribute comprised by a second data object of said second group of data objects, and wherein said method further comprises:

generating, by said computing system, a data manipulation add command for adding said second attribute value to said first attribute; and storing, by said computing system, said data manipulation add command on said third list.

18. The computing system of claim 13, wherein said comparing determines that there is a first attribute value for a first attribute comprised by a first data object of said first group of data objects and there is no attribute value for a second attribute comprised by a second data object of said second group of data objects, and wherein said method further comprises:

generating, by said computing system, a data manipulation delete command for deleting said first attribute value; and storing, by said computing system, said data manipulation delete command on said third list.

19. The computing system of claim 13, wherein said configuration data indicates that said third group of data objects comprise only data objects that comprise changes between said first group of data objects and said second group of data objects.

20. The computing system of claim 13, wherein said configuration data indicates that said third group of data objects comprise first data objects that comprise changes between said first group of data objects and said second group of data objects and second data objects that do not comprise changes between said first group of data objects and said second group of data objects.

21. The computing system of claim 13, wherein said comparing is performed as a sequential process comprising multiple iterations.

22. The computing system of claim 13, wherein said configuration data comprises a configuration setting value for defining said third list, and wherein said configuration setting value is saved as a variable.

* * * * *